US012772962B2

(12) United States Patent
Saxer

(10) Patent No.: US 12,772,962 B2
(45) Date of Patent: Oct. 27, 2026

(54) AQUACULTURE TANK SYSTEM

(71) Applicant: Only Alpha Pool Products, LLC, Fort Wayne, IN (US)

(72) Inventor: Timothy M. Saxer, Angola, IN (US)

(73) Assignee: Only Alpha Pool Products, LLC, Fort Wayne, IN (US)

( * ) Notice: Subject to any disclaimer, the term of this patent is extended or adjusted under 35 U.S.C. 154(b) by 0 days.

(21) Appl. No.: 19/037,463

(22) Filed: Jan. 27, 2025

(65) Prior Publication Data

US 2025/0241279 A1 Jul. 31, 2025

Related U.S. Application Data

(60) Provisional application No. 63/625,400, filed on Jan. 26, 2024.

(51) Int. Cl.
*A01K 63/00* (2017.01)

(52) U.S. Cl.
CPC .................................. *A01K 63/003* (2013.01)

(58) Field of Classification Search
CPC .. A01K 63/003; E04H 4/0031; E04H 4/0043; E04H 4/0062; E04H 4/005; E04H 2004/0068; B65D 90/08; B65D 90/02; B65D 90/501; B65D 2501/2405; B65D 2501/24159; B65D 2501/24165
USPC ................. 119/245; 220/686, 683, 682, 677; 52/169.7
See application file for complete search history.

(56) References Cited

U.S. PATENT DOCUMENTS

| | | | | |
|---|---|---|---|---|
| 1,842,735 A * | 1/1932 | Spence | B65D 90/08 | 220/4.12 |
| 4,177,614 A * | 12/1979 | Arp | E04H 4/0043 | 52/247 |
| 4,860,914 A * | 8/1989 | Derni | E04H 4/0031 | 220/4.16 |
| 6,715,243 B1 * | 4/2004 | Fons | E04H 12/085 | 52/192 |
| 8,813,684 B2 * | 8/2014 | Buchanan | A01K 61/60 | 119/226 |
| 9,556,615 B1 * | 1/2017 | Zettell | E04C 2/388 | |
| 11,926,471 B2 | 3/2024 | Loh | | |
| 2007/0144082 A1 * | 6/2007 | Kantor | E04H 4/0043 | 52/169.7 |

(Continued)

FOREIGN PATENT DOCUMENTS

| | | |
|---|---|---|
| CN | 201474343 U | 5/2010 |
| CN | 105672733 A | 6/2016 |

(Continued)

OTHER PUBLICATIONS

Notification of Transmittal of the International Search Report and the Written Opinion of the International Searching Authority, or the Declaration dated Apr. 28, 2025 for the International Application No. PCT/US2025/013123 (10 pages).

*Primary Examiner* — Zoe Tam Tran
(74) *Attorney, Agent, or Firm* — TAYLOR & EDELSTEIN, PC

(57) ABSTRACT

An aquaculture tank system includes: a first wall panel; a second wall panel; and a wedge insert positioned between and coupled with the first wall panel and the second wall panel such that the first wall panel and the second wall panel are thereby arranged straight relative to one another.

18 Claims, 9 Drawing Sheets

(56) References Cited

U.S. PATENT DOCUMENTS

| | | | | |
|---|---|---|---|---|
| 2007/0266490 | A1* | 11/2007 | Foy | E04H 4/0043 4/496 |
| 2013/0098929 | A1* | 4/2013 | Lovelace | B65D 90/205 220/682 |
| 2013/0232681 | A1* | 9/2013 | Ebenspanger | E04H 4/0018 4/584 |
| 2014/0173820 | A1* | 6/2014 | Campodonico | E04H 4/0031 4/506 |
| 2018/0002107 | A1* | 1/2018 | Fingerhut | E04C 2/22 |

FOREIGN PATENT DOCUMENTS

| | | | |
|---|---|---|---|
| CN | 206485810 | U | 9/2017 |
| KR | 10-0596696 | B1 | 10/2006 |

* cited by examiner

AQUACULTURE TANK SYSTEM

CROSS REFERENCE TO RELATED APPLICATIONS

This is a non-provisional application based upon U.S. provisional patent application Ser. No. 63/625,400, entitled "AQUACULTURE TANK SYSTEM", filed Jan. 26, 2024, which is incorporated herein by reference.

BACKGROUND OF THE INVENTION

1. Field of the Invention

The present invention relates to aquaculture systems, and, more particularly, to aquaculture tank systems.

2. Description of the Related Art

Aquaculture provides for controlled cultivation of aquatic organisms, including plants and animals. Such animals include, but are not limited to, fish, mollusks (i.e., clams, mussels), and crustaceans (i.e., shrimp, lobsters, crabs). Aquaculture can be provided, for example, offshore, inshore, or onshore, and can include tanks for providing at least a partially enclosed environment for the cultivation. Such tanks can be referred to as tank systems, which can, by way of example and not limitation, hold fish.

A problem may arise during manufacturing of a wall of the tank. That is, depending upon the materials used for the tank wall, there can be difficulty in obtaining a properly straight tank wall.

What is needed in the art is a way to achieve straight tank walls of an aquaculture tank system.

SUMMARY OF THE INVENTION

The present invention provides an aquaculture tank system which includes a wedge insert that couples a first wall panel and a second wall panel together such that the first and second wall panels are arranged straight relative to one another.

The invention in one form is directed to an aquaculture tank system including: a first wall panel; a second wall panel; and a wedge insert positioned between and coupled with the first wall panel and the second wall panel such that the first wall panel and the second wall panel are thereby arranged straight relative to one another.

The invention in another form is directed to a method of using an aquaculture tank system, the method including the steps of: providing that the aquaculture tank system includes a first wall panel and a second wall panel; and positioning a wedge insert between, and coupling the wedge insert with, the first wall panel and the second wall panel such that the first wall panel and the second wall panel are thereby arranged straight relative to one another.

An advantage of the present invention is that the wedge insert overcomes the draft angles of the first and second wall panels such that the first and second wall panels are arranged vertically straight (viewed in cross-section) relative to one another.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one embodiment of the invention, and such exemplifications are not to be construed as limiting the scope of the invention in any manner.

DETAILED DESCRIPTION OF THE INVENTION

Figure 1:
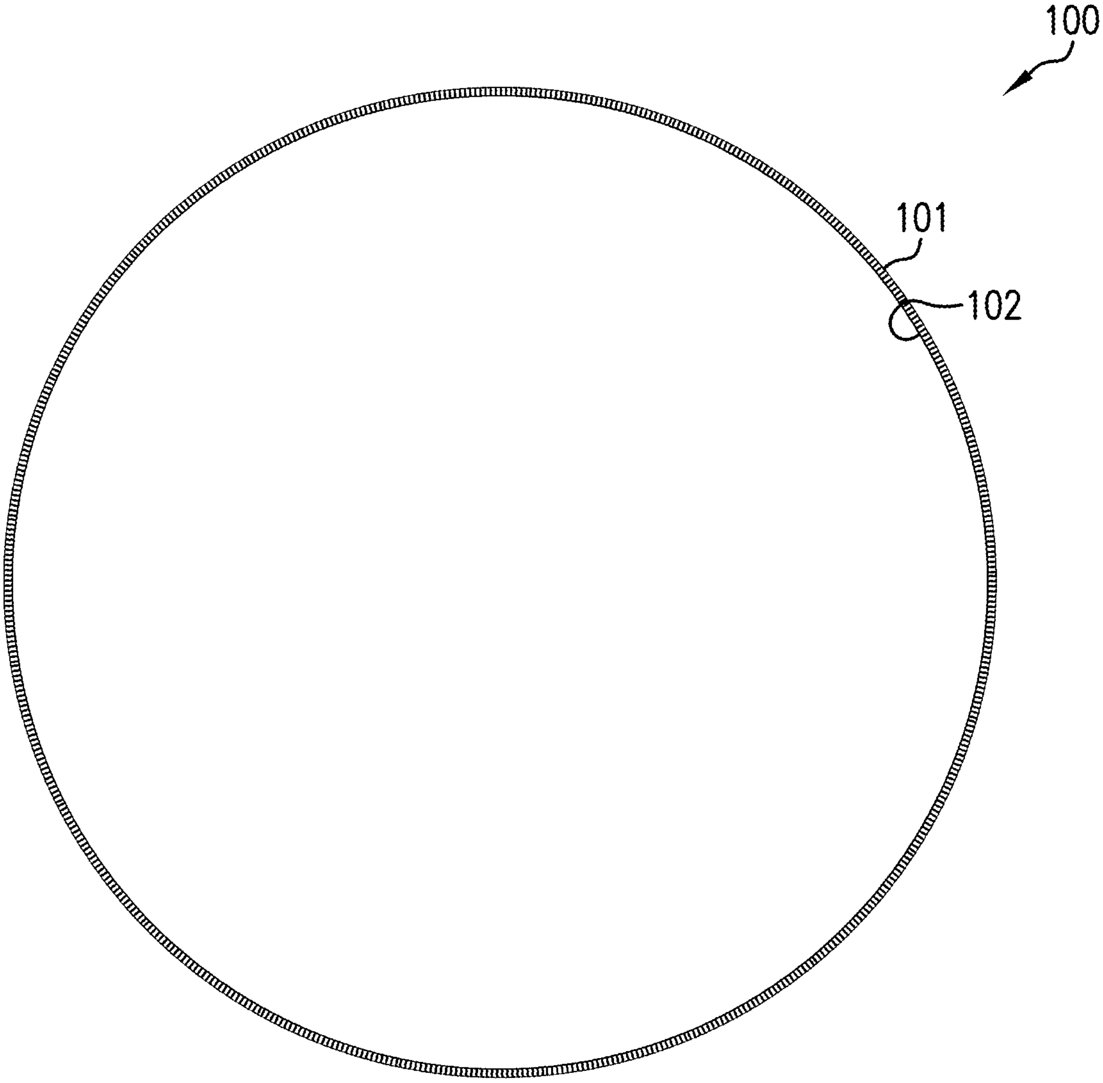
FIG. 1 is a top view of an aquaculture tank system, in accordance with an exemplary embodiment of the present invention.

Referring now to the drawings, and more particularly to FIG. 1, there is shown a top view of an aquaculture tank system 100 (which can also be referred to as tank 100). Tank 100 generally includes a plurality of panels 101 coupled with one another to form at least in part a vertical tank wall 102 configured for in part holding a liquid therein, such as water. FIG. 1 shows that tank 100 is a round tank, such that wall 102 forms a round enclosure. According to an alternative embodiment of the tank system of the present invention, the tank walls can be straight, rather than round, or a combination of straight and round (i.e., an oval or elliptical tank). Further, panels 101 can have any suitable size and shape. Further, it is presumed herein that panels 101 are made of a composite material (for example and not limitation, a fiberglass product), which is mentioned by way of example and not limitation. According to an alternative embodiment of the present invention, panels 101 can be made of aluminum, or another suitable material. Panels 101 can be made in any suitable way, for example and not limitation, molding, such as compression molding.

Figure 2:
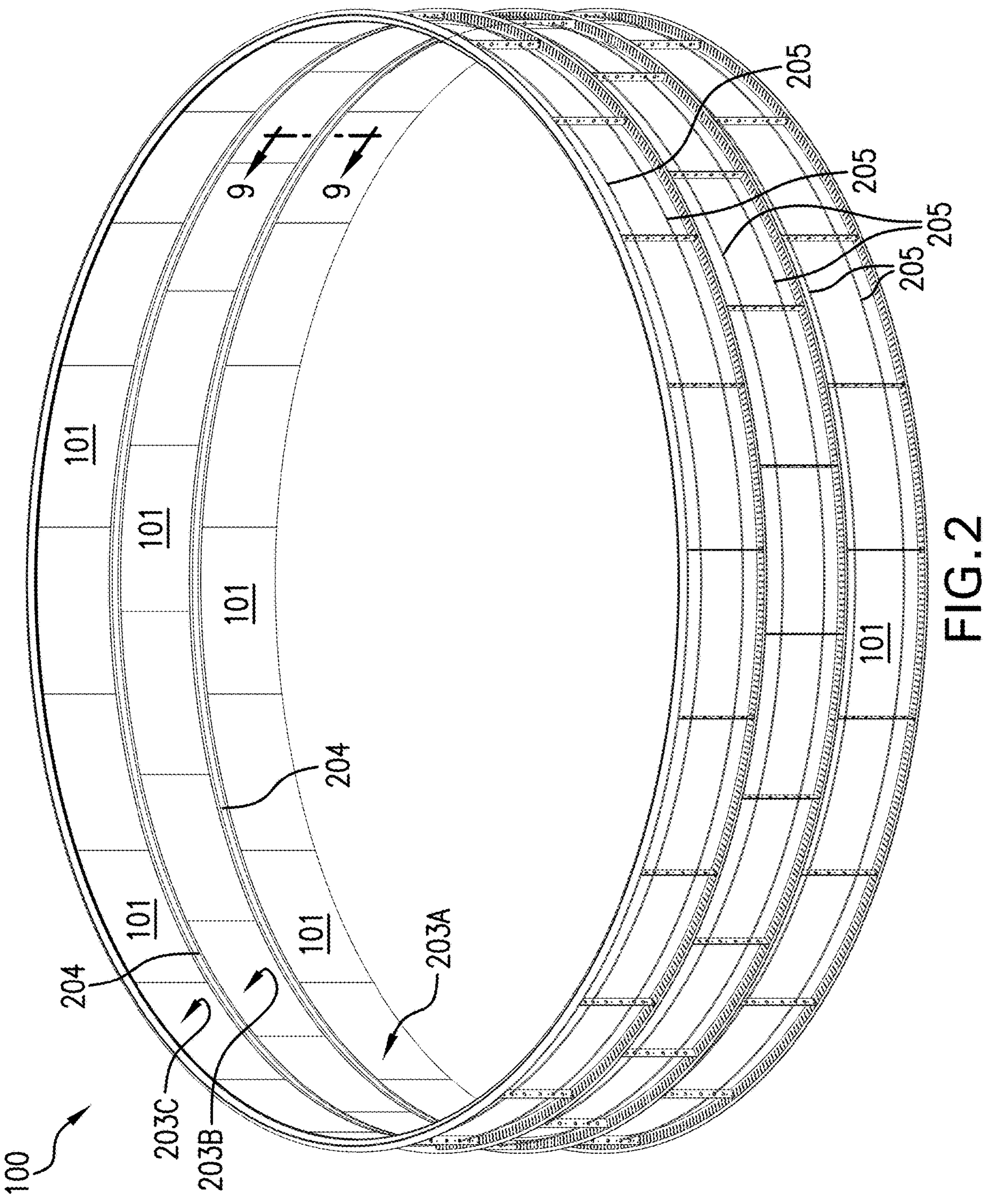
FIG. 2 is a perspective view of the aquaculture tank system of FIG. 1, the aquaculture tank system including panels and wedge inserts, in accordance with an exemplary embodiment of the present invention.

Referring now to FIG. 2, there is shown a perspective view of tank 100. Each panel 101, according to the embodiment shown in FIG. 2, can have a shape that is curved (any suitable shape can be used, whether or not with a curve). Horizontally adjacent panels 101 are coupled with one another (such as at their longitudinal ends, as shown in FIG. 2) using any suitable way, such as (by way of example and not limitation) fasteners and/or adhesives (such as using a joint seal). Tank 100 includes panels 101 arranged in three (horizontal) rows 203A, 203B, 203C (alternatively, according to other embodiments of the present invention, the tank can include only two rows of panels or more than three rows of panels). Rows 203A, 203B, 203C are arranged vertically relative to one another; row 203A is shown to be the lowermost row, row 203C is shown to be the uppermost row, and row 203B is shown to be the middle row positioned between rows 203A and 203C. Panels 101 of vertically adjacent rows 203A, 203B, 203C are offset from one another (such that seams of horizontally adjacent panels in one row are horizontally offset relative to horizontally adjacent panels of an adjacent row), as shown in FIG. 2. Tank 100 further includes cables 205 surrounding panels 101 to provide support to panels 101. Six cables 205 (for example and not limitation, stainless steel cables) are shown in FIG. 2, namely, two cables 205 per row 203A, 203B, 203C (for example and not limitation, stainless steel cables can be used, together with stainless steel suitable numbers of eye-to-eye turnbuckles and stainless steel cable clamps). Using two cables 205 per row 203A, 203B, 203C is merely by way of example and not limitation, and thus any suitable number of cables 205 can be used; for example and not limitation, six cables 205 may be used per row 203A, 203B, 203C, instead of two.

Tank 100 further includes a wedge insert 204 (which can also be referred to as a wedge radius wall insert for curved walls (as shown in FIGS. 1-2), or a wedge straight wall insert for straight walls) (the longitudinal extent of wedge 204 is not necessarily depicted in FIG. 2). Wedge inserts 204 are positioned between and coupled with vertically adjacent rows 203A, 203B, 203C such that rows 203A, 203B, 203C are arranged vertically relative to one another thereby. More specifically, the lower wedge insert 204 shown in FIG. 2 is positioned between rows 203A and 203B, and the upper wedge insert 204 shown in FIG. 2 is positioned between rows 203B and 203C. Wedge insert 204 can be made of any suitable material, such as (for example and not by way of limitation) a thermoplastic, such as (for example and not by way of limitation) Acrylonitrile Butadiene Styrene (ABS). Wedge insert 204 can be formed by any suitable way, for example (and not by way of limitation) extrusion or molding, such as compression molding. Further, wedge insert 204 is distinct from an optional F-track.

Figure 9:
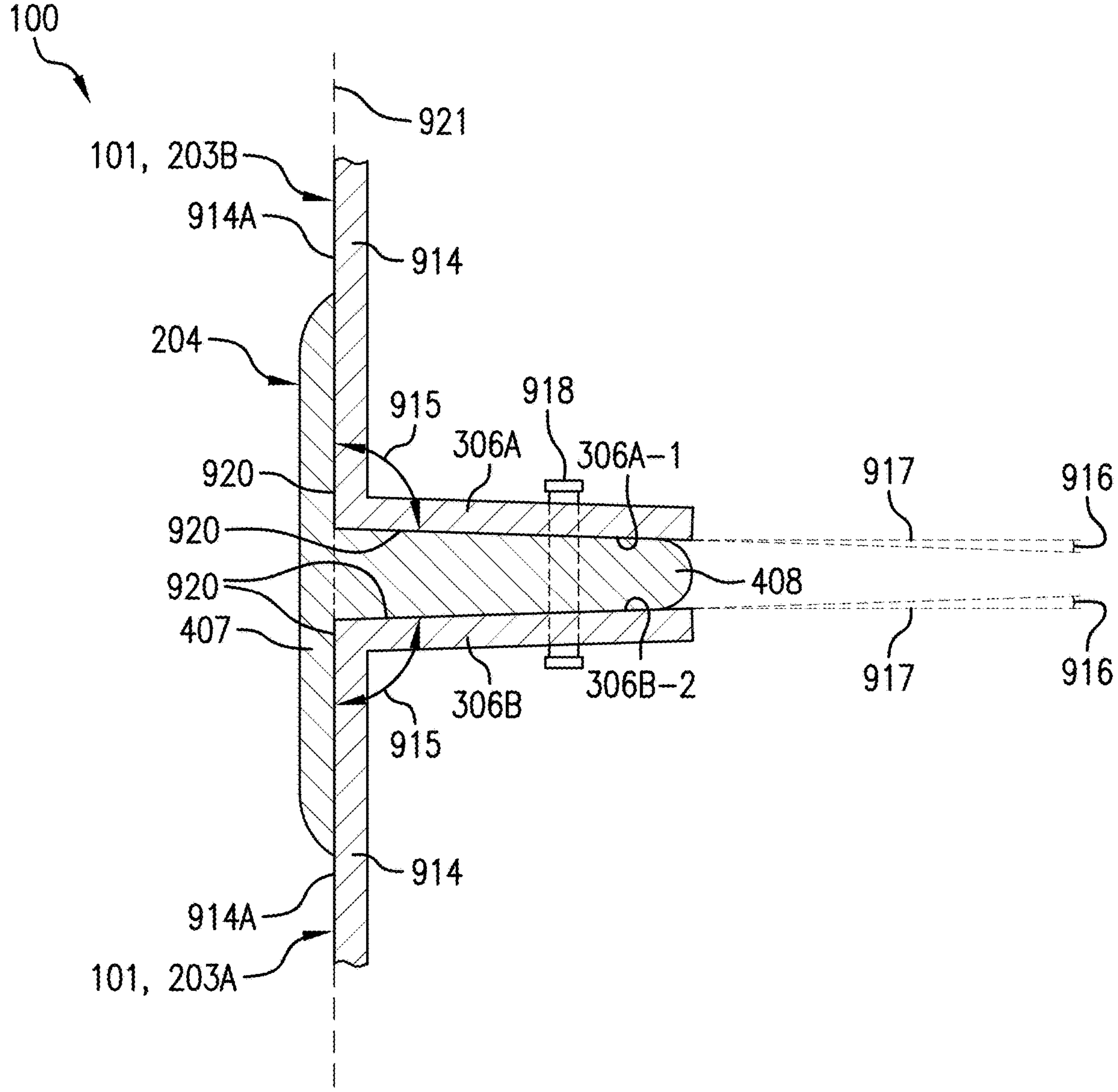
FIG. 9 is schematically a cross-sectional view of the aquaculture tank system of FIG. 1, taken along line 9-9 of FIG. 2, with portions broken away, in accordance with an exemplary embodiment of the present invention.

Thus, aquaculture tank system 100 includes: a first wall panel 101 in row 203A, 203B, or 203C; a second wall panel 101 in row 203A, 203B, or 203C; and a wedge insert 204 positioned between and coupled with the first wall panel 101 and the second wall panel 101 such that the first wall panel 101 and the second wall panel 101 are thereby arranged straight relative to one another (as more clearly seen in FIG. 9). Further, tank 100 is shown in FIG. 2 to include a plurality of wedge insert 204 between rows 203A and 203B and between rows 203B and 203C; it can be appreciated that any suitable number of wedge inserts (one or more) can be used at the junction of adjacent rows 203A, 203B, 203C. By way of example and not limitation, tank 100 may have a circumference of 40 feet and a height of 129 inches; other dimensions are within the scope of the present invention.

Figure 3:
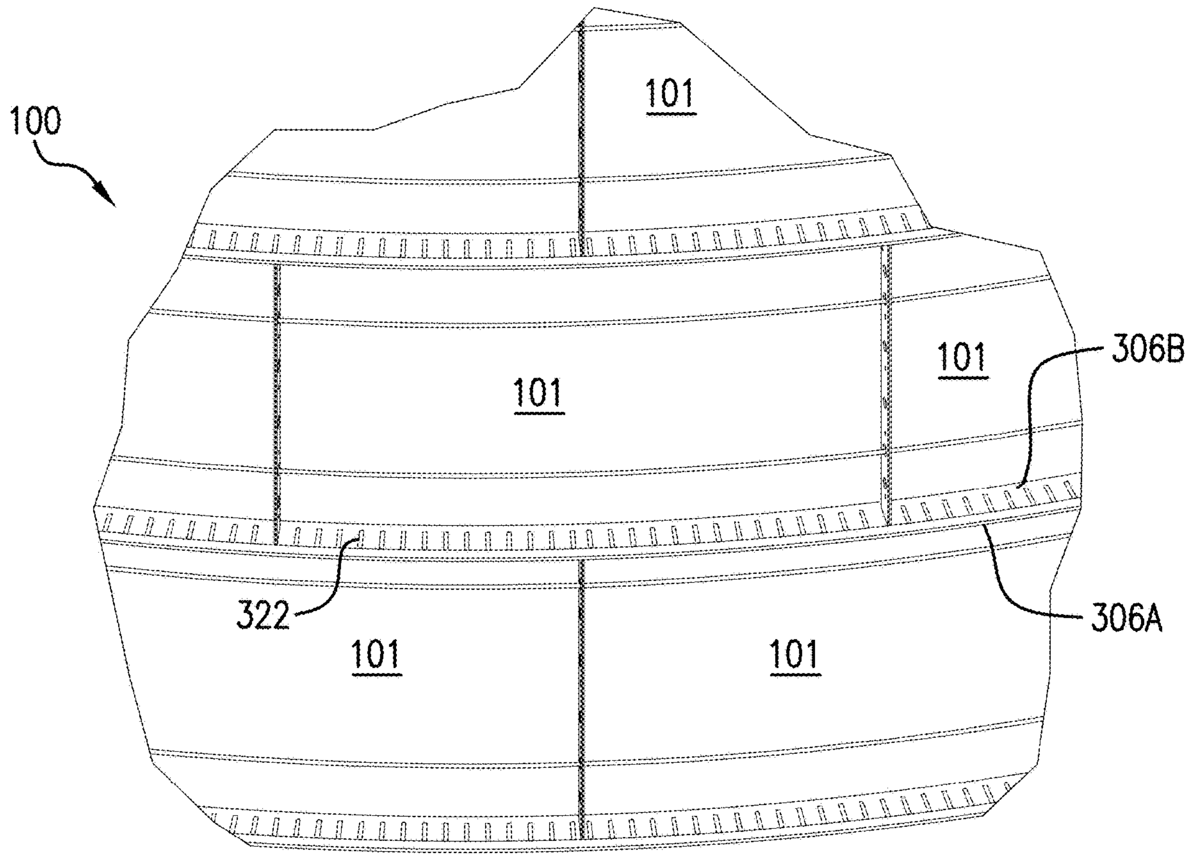
FIG. 3 is schematically a radially outer perspective view of aquaculture tank system of FIG. 1, with portions broken away, in accordance with an exemplary embodiment of the present invention.

Referring now to FIG. 3, there is shown schematically a radially outer perspective view of tank 100, with portions broken away. Each panel 101, along respective lower and upper longitudinally extending edges, includes a lower flange 306A and an upper flange 306B (which are shown schematically in FIGS. 2 and 3). Flanges 306A, 306B are used to connect adjacent flanges 306A, 306B of vertically adjacent panels 101 together using any suitable way of connection, such as an adhesive and/or fasteners (i.e., bolts 918 in FIG. 9) (such as bolts or screws (through respective holes in flanges 306A, 306B), nuts, washers, and the like) and wedge inserts 204. Flanges 306A, 306B include radially extending openings 322. Wedge insert 204 includes a plurality of tabs 408 (FIG. 4), which can be visible in openings 322, but for illustrative purposes tabs 408 are not shown in FIG. 1, 2, or 3. Further, though FIGS. 2 and 3 indicate that openings 322 extend to the radial outer edge of flanges 306A, 306B, this need not be the case; openings 322 can be spaced apart (equally or not) from the radial inner and outer edges of flanges 306A, 306B. Further, though FIGS. 2 and 3 indicate that flanges 306A, 306B are positioned in contact with one another, flanges 306A, 306B can be spaced apart from one another (e.g., FIGS. 9 and 10).

Figure 4:
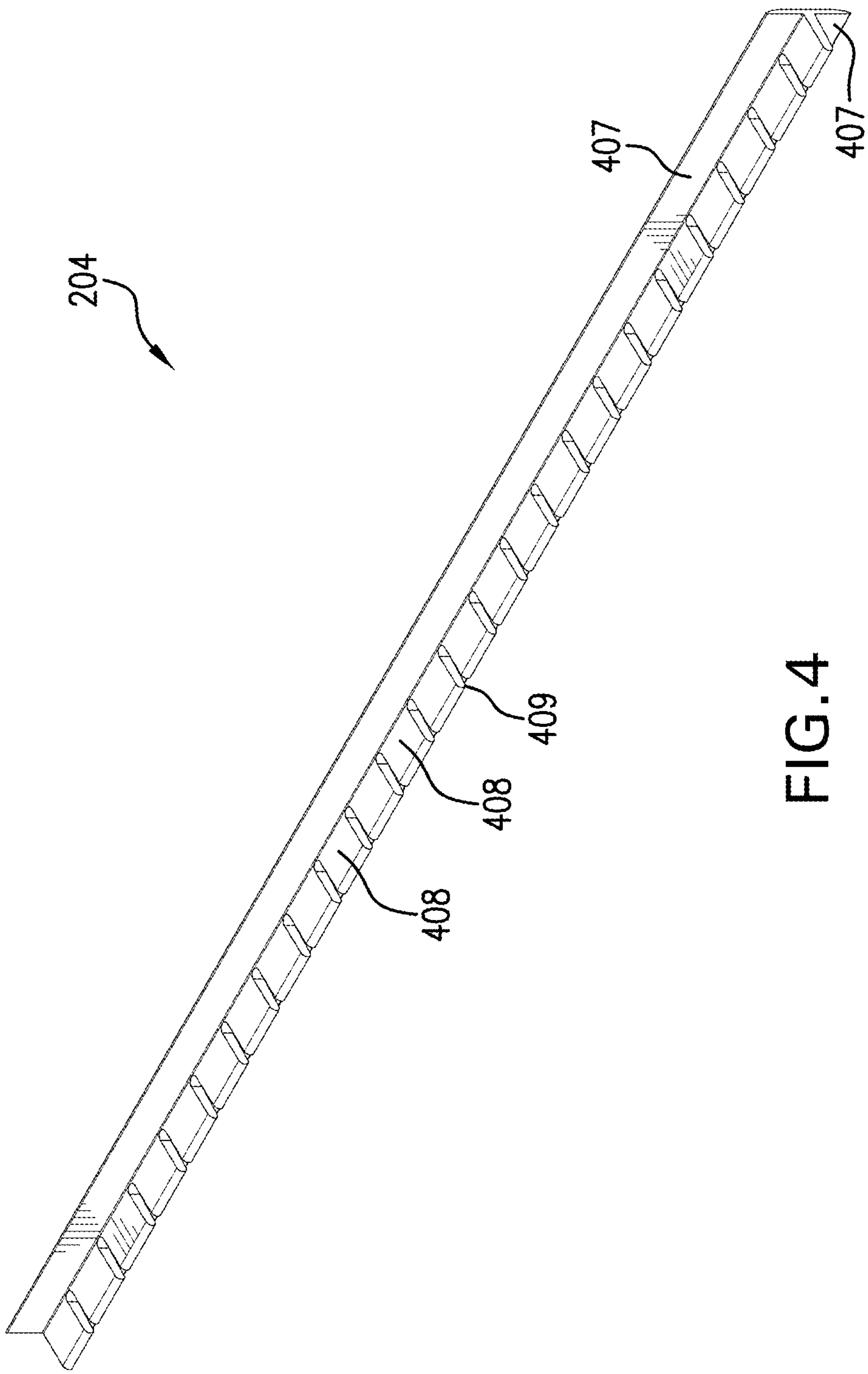
FIG. 4 is an outer perspective view of the wedge insert of FIG. 2, in accordance with an exemplary embodiment of the present invention.

Referring now to FIG. 4, there is shown an outer perspective view of a single wedge insert 204 (when wedge insert 204 is used as part of a curved wall (as in FIG. 1), this view can be referred to as a radially outer perspective view). Wedge insert 204 includes a support 407 and a plurality of horizontal tabs 408 connected to support 407. Support 407, according to an exemplary embodiment of the present invention, is a vertical support 407, as indicated in the cross-sectional view of FIG. 9. Further, wedge insert 204, with support 407 and tab 408 forms a T-shaped configuration, as shown in the cross-sectional view of FIG. 9. By way of example and not limitation, wedge insert 204 can have a length of six feet (shorter or longer lengths of wedge insert are within the scope of the present invention). Further, wedge insert 204 includes gaps 409 between adjacent tabs 408. Gaps 409 provide spacing between adjacent tabs 408 so that wedge insert 204 can be bent so as to form a curve and thereby conform to the round shape of tank 100. Thus, wedge insert 204 can remain straight or can readily flex in a curved shape, because of gaps 409.

Figure 5:
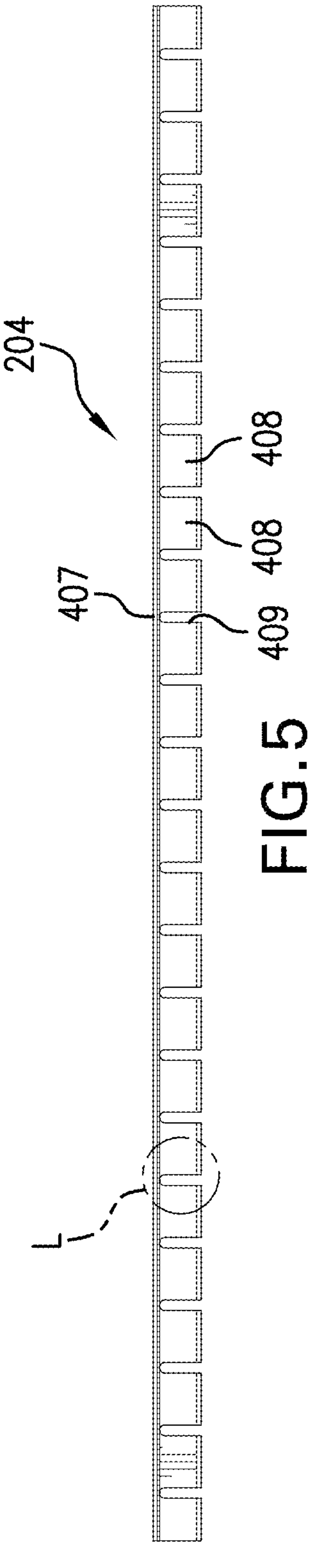
FIG. 5 is a top view of the wedge insert of FIG. 2, in accordance with an exemplary embodiment of the present invention.

Referring now to FIG. 5, there is shown a top view of wedge insert 204. Wedge insert 204 is shown to include support 407 and tabs 408 connected to support 407. Gaps 409 are shown respectively between adjacent tabs 408.

Figure 6:
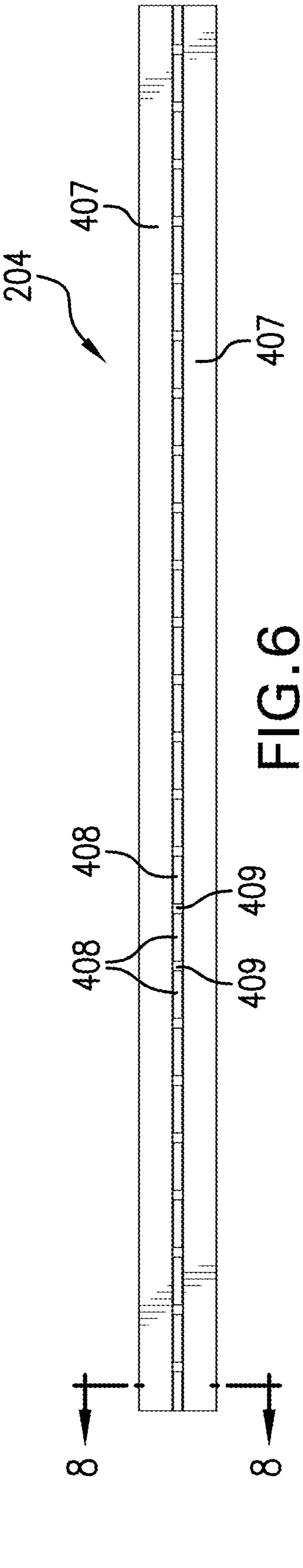
FIG. 6 is an outer view of wedge insert of FIG. 2, in accordance with an exemplary embodiment of the present invention.

Referring now to FIG. 6, there is shown an outer view of wedge insert 204 (when wedge insert 204 is used as part of a curved wall (as in FIG. 1), this view can be referred to as a radially outer view). Wedge insert 204 is shown to include support 407 and tabs 408 connected to support 407. Gaps 409 are shown respectively between adjacent tabs 408.

Figure 7:
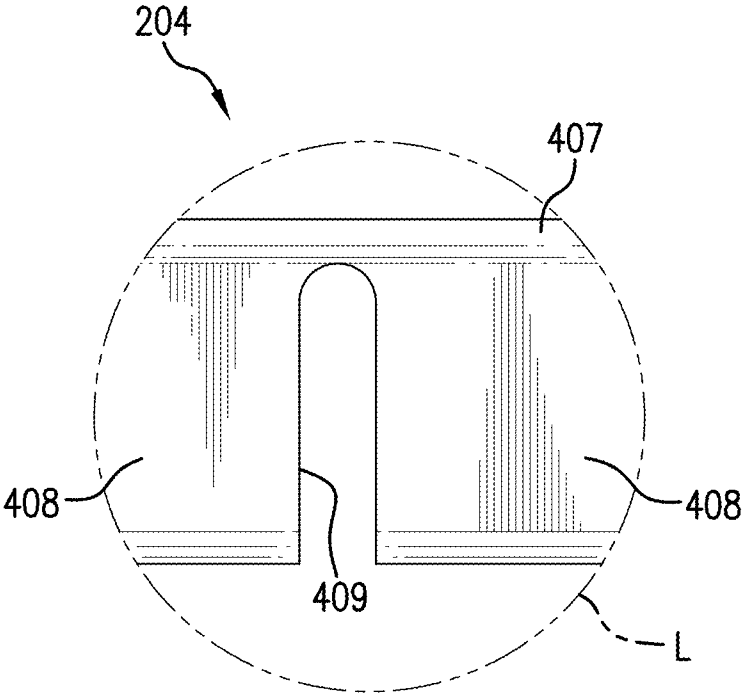
FIG. 7 is a top view of the wedge insert of FIG. 2, with portions broken away, in accordance with an exemplary embodiment of the present invention.

Referring now to FIG. 7, there is shown a top view of wedge insert 204, with portions broken away. More specifically, FIG. 7 shows a zoomed-in, detail view of wedge insert 204 of FIG. 5, with the detail view being taken along line L in FIG. 5. Wedge insert 204 is shown to include support 407 and tabs 408 connected to support 407. Gaps 409 are shown respectively between adjacent tabs 408.

Figure 8:
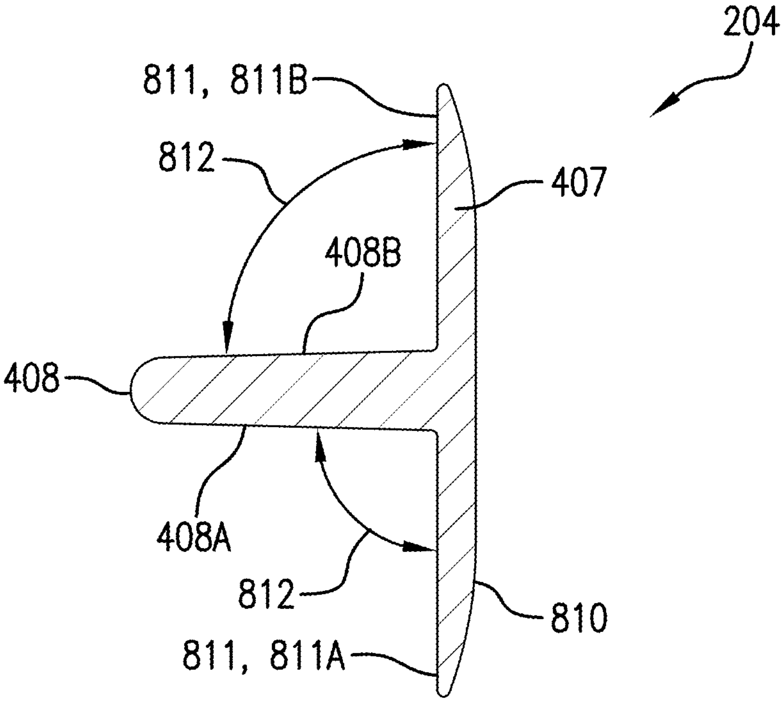
FIG. 8 is a cross-sectional view of the wedge insert taken along line 8-8 in FIG. 6, in accordance with an exemplary embodiment of the present invention.

Referring now to FIG. 8, there is shown a cross-sectional view of wedge insert 204 taken along line 8-8 in FIG. 6. Wedge insert 204 is shown to include support 407 and a respective tab 408 connected to support 407. Support 407 includes a radial inner surface 810 and a radial outer surface 811 (it is assumed that wedge insert 204 forms part of a curved wall). Radial outer surface 811 is vertical and includes a lower portion 811A below tab 408 and an upper portion 811B above tab 408, lower and upper portions 811A, 811B being intermediated by tab 408. Tab 408 projects away from radial outer surface 811 and thus extends from a proximal end connected to support 407 to a distal end. Tab 408 includes a bottom surface 408A and a top surface 408B. Further, upper portion 811B of radial outer surface 811 and top surface 408B of tab 408 form an angle 812 therebetween which is greater than 90 degrees, for example, 91 degrees as shown in FIG. 8. Similarly, lower portion 811A of radial outer surface 811 and bottom surface 408A of tab 408 form an angle 812 therebetween which is greater than 90 degrees, for example, 91 degrees as shown in FIG. 8. Thus, the angle that top surface 408B of tab 408 makes with a horizontal line is, in this example, 1 degree (90+1=91 degrees), and the angle that bottom surface 408A of tab 408 makes with a horizontal line is, in this example, also 1 degree (90+1=91 degrees). Angle 812 can be any suitable angle, such as any suitable angle greater than 90 degrees (i.e., 91 degrees, 92 degrees, etc.). The reason for angles 812 is explained more fully below but is formed due to draft angles formed on panels 101.

Referring now to FIG. 9, there is shown schematically a cross-sectional view of tank 100, taken along line 9-9 of FIG. 2, with portions broken away. Tank 100 is shown to include a respective panel 101 (with portions broken away) of lower row 203A, a respective panel 101 (with portions broken away) of middle row 203B, and a respective wedge insert 204; it can be appreciated that what is shown in and described with respect to FIG. 9 regarding rows 203A and 203B and the wedge insert 204 therebetween and the junction of rows 203A and 203B also applies to rows 203C and the junction of rows 203B and 203C with a respective wedge insert(s) 204 therebetween (thus the discussion herein of the joinder of rows 203A and 203B by wedge insert(s) 204A serves as a representative discussion as well for the joinder of other rows together and thus is not repeated herein). Panel 101 of lower row 203A includes a main wall 914 and upper flange 306B connected to the respective main wall 914, and panel 101 of middle row 203B includes a main wall 914 and lower flange 306A connected to the respective main wall 914. Each main wall 914 of a respective panel 101 includes a radial inner surface 914A. Upper flange 306B (of panel 101 of lower row 203A) includes an upper surface 306B-2 which is in contact with bottom surface 408A of tab 408 when wedge insert 204 is installed between lower and upper flanges 306A, 306B, and lower flange 306A (of panel 101 of middle row 203B) includes a lower surface 306A-1 which is in contact with top surface 408B of tab 408 when wedge insert 204 is installed between lower and upper flanges 306A, 306B. Flanges 306A, 306B, for illustrative purposes, are shown as having a (radial) length similar to that of tabs 408, but it should be appreciated that flanges 306A, 306B can have any length relative to tabs 408; for instance, flanges 306A, 306B can be substantially longer than tabs 408 and thus extend substantially farther to the right in FIG. 9 than tab 408. According to an exemplary embodiment of the present invention, flanges 306A, 306B can each be four inches in radial length and tabs 408 can be approximately two inches in radial length (these lengths are by way of example and not limitation). Further, bolts 918 (together with any other suitable fasteners, such as nuts and/or washers) can be used to fasten flanges 306A, 306B to tabs 408 (alternatively, bolts 918 can be omitted). A suitable number of bolts 918 can be used per flange 306A, 306B; for example and not limitation, three or four such bolts 918 may be used per flange 306A, 306B.

Upper surface 306B-2 of upper flange 306B of panel 101 of lower row 203A and radial inner surface 914A of panel 101 of lower row 203A form an angle 915 therebetween which is greater than 90 degrees, for example, 91 degrees, as shown in FIG. 9 (though FIG. 9 is not necessarily drawn to scale). Thus, in this embodiment of the present invention, upper surface 306B-2 of upper flange 306B of panel 101 of lower row 203A forms an angle 916 of 1 degree with a horizontal line 917 (as indicated by the broken line extending from upper surface 306B-2), as shown in FIG. 9. Similarly, lower surface 306A-1 of lower flange 306A of panel 101 of middle row 203B and radial inner surface 914A of panel 101 of middle row 203B form an angle 915 therebetween which is greater than 90 degrees, for example, 91 degrees, as shown in FIG. 9. Thus, in this embodiment of the present invention, lower surface 306A-1 of lower flange 306A of panel 101 of middle row 203B forms an angle 916 of 1 degree with a horizontal line 917 (as indicated by the broken line extending from lower surface 306A-1), as shown in FIG. 9.

Angle 916 can also be referred to as a draft angle, which is used for manufacturing purposes (i.e., to facilitate removal of panel 101 from a mold) (draft angle 916 can be any suitable angle, such one degree, two degrees, etc., and is assumed to be one degree herein) (further, angle 916 and angle 812 can be the same value or different values). Because of draft angle 916, however, main walls 914 of vertically adjacent panels 101 (for example, of lower and middle rows 203A, 203B) would not remain vertical if upper surface 306B-2 of upper flange 306B of panel 101 of lower row 203A and lower surface 306A-1 of lower flange 306A of panel 101 of middle row 203B were positioned in direct contact with one another. Accordingly, wedge insert 204 solves this problem, with bottom and upper surfaces 408A, 408B of tab 408 being formed at angles that correspond to angles 915, 916 of flanges 306A, 306B (namely, angle 812 and a corresponding angle—in this embodiment, 1 degree—that bottom and upper surfaces 408A, 408B of tabs 408 make with a respective horizontal line). In this way, tabs 408 mate with flanges 306A, 306B so that main walls 914 of panels 101 of rows 203A, 203B are vertical.

Further, inner surface 914A of main wall 914 of panel 101 of row 203A and inner surface 914A of main wall 914 of panel 101 of row 203B (as shown in FIG. 9) are arranged on a axis 921 by way of wedge insert 204 and thus are straight relative to one another (as seen in FIG. 9). Further, panels 101 of rows 203A, 203B can be glued and wedge insert 204 can be glued together using adhesive 920 (which can be, for example and not limitation, a flex glue), according to an exemplary embodiment of the present invention.

Depending upon the size of the perimeter of tank 101 and the length of wedge insert 204, a plurality of wedge inserts 204 can be used in an end-to-end fashion so that wedge inserts 204 are positioned all the way around round tank 100 between rows 203A, 203B of panels 101. Further, though only lower and middle rows 203A, 203B of panels 101 have been discussed in detail, middle and upper rows 203B, 203C of panels 101 can be joined together using one or more wedge inserts 204 in a manner substantially similar to that described herein with respect to lower and middle rows 203A, 203B of panels 101. Similarly, the tank system of the present invention can include more than three rows of panels

101, such that a corresponding number of rows of wedge inserts 204 can be used between additional adjacent rows of panels 101.

Figure 10:
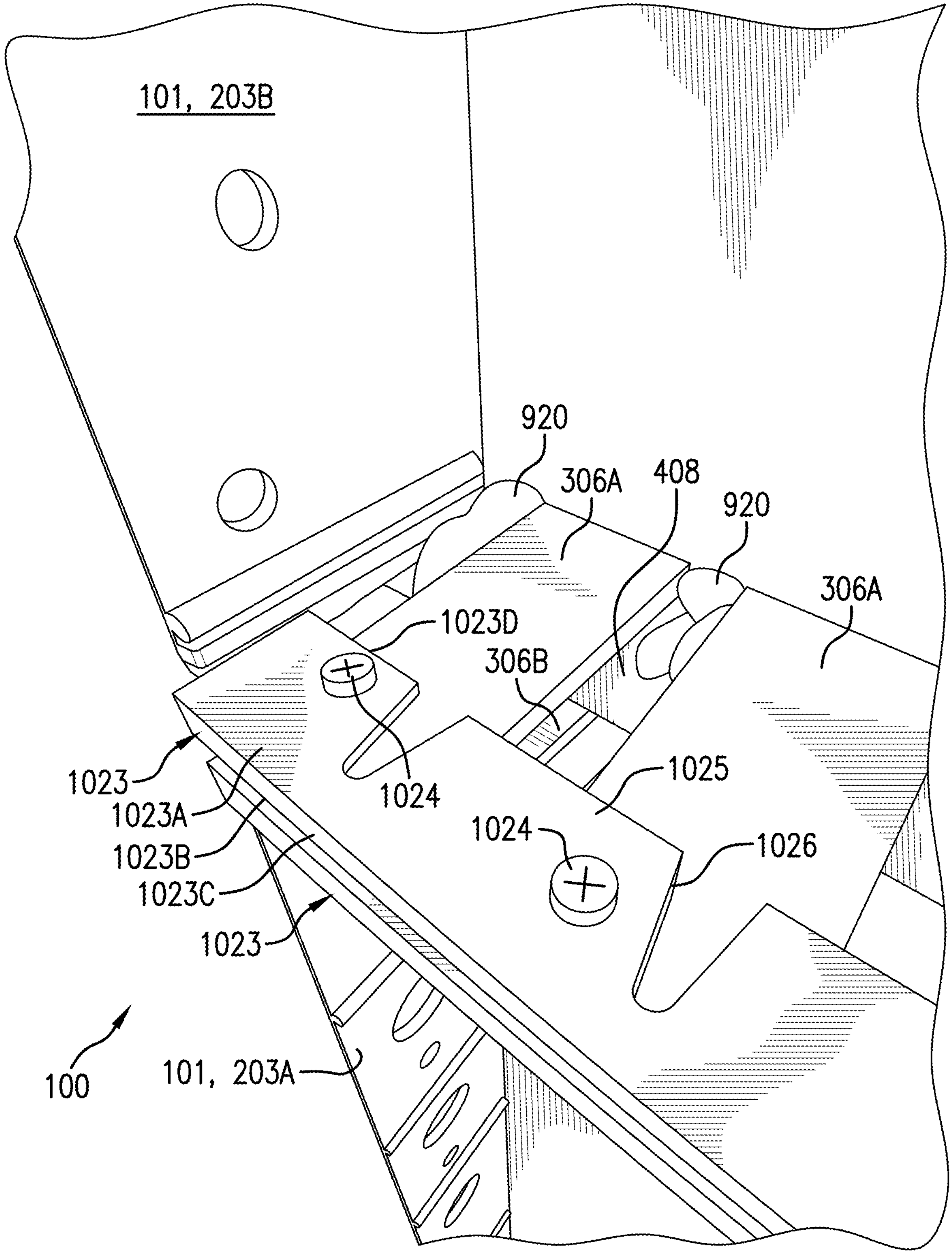
FIG. 10 is a perspective view of another embodiment of the aquaculture tank system, in accordance with an exemplary embodiment of the present invention.

Referring now to FIG. 10, there is shown a perspective view of another embodiment of tank system 100 including two panels 101 and wedge insert 204, according to an exemplary embodiment of the present invention. FIG. 10 shows an end view (from the outer radial side) of these two panels 101 and wedge insert 204. For illustrative purposes, panels 101 in FIG. 10 belong to rows 203A and 203B respectively. Wedge insert 204 is shown positioned between flanges 306B, 306A of lower and upper panels 101 of rows 203A, 203B. Support 407 is not visible in FIG. 10, but a respective tab 408 is shown between flanges 306A, 306B. In this embodiment, tank system 100 is shown to further include two U-channel devices 1023 (more specifically, upper and lower U-channel devices 1023). Respective U-channel devices 1023 are shown to fit on a respective radial outer end of flanges 306A, 306B and thereby to provide further support to flanges 306A, 306B and thus help to create and/or maintain the desired straight axis 921 between vertically adjacent wall panels 101; stated another way U-shaped channel devices 1023 hold the radii in place. Each U-shaped channel device has a U-shaped cross-section with an upper leg 1023A, a lower leg 1023B, and a base 1023C attaching the upper and lower legs 1023A, 1023B together to form the U and thus a U-shaped channel 1023D which receives the respective radial outer end of flanges 306A, 306B. Vertically adjacent U-channel devices 1023 (as shown in FIG. 10) contact one another; more specifically, lower leg 1023B of the upper U-channel device 1023 contacts upper leg 1023A of the lower U-channel device 1023. Further, suitable fasteners 1024 can be used to secure the respective U-channel devices 1023 to flanges 306A, 306B; fastener 1024 can be a bolt, for example, and can have nuts and/or washers attached thereto. During assembly, holes can be drilled into U-channel devices 1023 and flanges 306A, 306B so that bolts 1024 can extend therethrough. A suitable number of bolts 1024 can be used per flange 306A, 306B; for example and not limitation, three or four such bolts 1024 may be used per flange 306A, 306B. Further, each U-channel device 1023 can include respective tabs 1025 and gaps 1026 therebetween, wherein the cooperation of tabs 1025 and gaps 1026 enable U-channel device 1023 to flex to varying degrees, so as to accommodate the shape of panels 101. Further, U-channel device 1023 can be made of any suitable material, such as a thermoplastic, such as a polycarbonate, and can be made in any suitable manner, such as molding.

In use, during assembly of tank 100, after forming the lower row 203A of panels 101, wedge insert 204 can be placed on panels 101 of lower row 203A, more specifically, at least in part on upper flanges 306B of panels 101 of lower row 203A. Lower portion 811A of radial outer surface 811 of support 407 of wedge insert 204 can be glued (using adhesive 920) to radial inner surface 914A of main wall 914 of a respective panel 101 of lower row 203A. Further, bottom surface 408A of tab 408 can be glued (using adhesive 920) to upper surface 306B-2 of upper flange 306B. Adhesive 920 can be located (for example and not limitation) wherever lower portion 811A, radial inner surface 914A, bottom surface 408A, and upper surface 306B-2 are positioned adjacent to one another; for example (and not by way of limitation), adhesive 920 can be located at the junction of lower portion 811A, radial inner surface 914A, bottom surface 408A, and upper surface 306B-2 and extend away from this junction in either direction (between lower portion 811A and radial inner surface 914A, and between bottom surface 408A and upper surface 306B-2) a select distance. Adhesive 920 can be any suitable adhesive, for example (but not limited to) methyl methacrylate (MMA) glue. Additional wedge inserts 204 can be secured to lower row 203A until wedge inserts 204 are all around lower row 203A. Next, the next row—row 203B of panels 101—is stacked on lower row 203A by way of wedge inserts 204. One or more holes can be drilled into various tabs 408 (such as each tab 408) while in the field during installation of tank 100, and these holes can be drilled so as to align with respective holes of lower and upper flanges 306A, 306B. Fasteners 918 can be used to secure flanges 306A, 306B to tabs 408; for example, respective bolts 918 can be inserted through the aligned holes of lower and upper flanges 306A, 306B and the hole(s) drilled in tabs 408, and these bolts 918 can be secured using respective nuts and washers. Further, upper portion 811B of radial outer surface 811 of support 407 of a respective wedge insert 204 can be glued (using adhesive 920) to radial inner surface 914A of main wall 914 of a respective panel 101 of middle row 203B, such as by way of MMA glue. Further, top surface 408B of tab 408 can be glued (using adhesive 920) to lower surface 306A-1 of upper flange 306B. Adhesive 920 can be located (for example and not limitation) wherever upper portion 811B, radial inner surface 914A, top surface 408B, and lower surface 306A-1 are positioned adjacent to one another; for example (and not by way of limitation), adhesive 920 can be located at the junction of upper portion 811B, radial inner surface 914A, top surface 408B, and lower surface 306A-1 and extend away from this junction in either direction (between upper portion 811B and radial inner surface 914A, and between top surface 408B and lower surface 306A-1) a select distance. Further, fasteners 918 can be finally secured so as to secure flanges 306A, 306B, and tab 408 together. Such assembly procedures can be performed for one or more tabs 408 (i.e., most or all such tabs 408) of each wedge insert 204, for adjacent rows of panels 101. Further, U-channel devices 1023 can be attached to flanges 306A, 306B using fasteners 1024. After installation of tank 100, tank 100 can be used to contain water, for example, and plants and/or animals therein.

Thus, use of wedge insert 204 provides for several advantages, which include the following. First, wedge insert 204 provides for the ability to overcome draft angles (i.e., angle 916) of molded products (i.e., panels 101, including flanges 306A, 306B of panels 101) so that panels 101 can be stacked vertically relative to one another. Stated another way, wedge insert 204 provides for stacking composite panels 101 at 90 degrees and thus to take away draft angles (and other manufacturing obstructions). Second, wedge insert 204 adds rigidity to tank walls 102. Third, wedge insert 204 enables tank 100 to be watertight (for example, with the use of a bead). Fourth, wedge insert 204 enables connection (such as a permanent connection) between vertically adjacent panels 101, such as by way of fasteners (i.e., bolts, fasteners, washers), wherein a respective bolt (i.e., bolt 918) can extend through corresponding holes (pre-formed) in flanges 306A, 306B and through a respective tab 408 of wedge insert 204 in a substantially vertical direction in FIG. 9. Fifth, wedge insert 204 can be used with a round tank (as in the figures) or with a tank that has one or more straight walls.

All dimensions herein or in figures are merely exemplary, and thus the present invention is not limited to any such dimensions.

Figure 11:
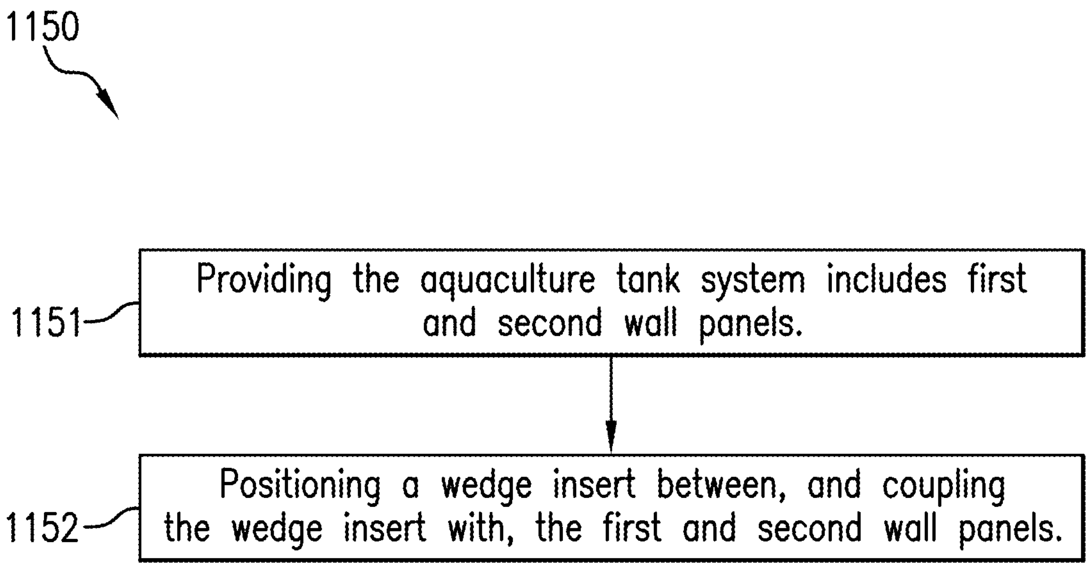
FIG. 11 is a flow diagram showing a method of using an aquaculture tank system, in accordance with an exemplary embodiment of the present invention.

Referring now to FIG. 11, there is shown a flow diagram of a method 1150 of using an aquaculture tank system 100, the method 1150 including the steps of: providing 1151 that the aquaculture tank system 100 includes a first wall panel 101 and a second wall panel 101; and positioning 1152 a wedge insert 204 between, and coupling the wedge insert 204 with, the first wall panel 101 and the second wall panel 101 such that the first wall panel 101 and the second wall panel 101 are thereby arranged straight relative to one another. The aquaculture tank system 100 can further include a first row of wall panels 203A, 203B, 203C, a second row of wall panels 203A, 203B, 203C, and a plurality of the wedge insert 204, the first row of wall panels 203A, 203B, 203C including the first wall panel 101, the second row of wall panels 203A, 203B, 203C including the second wall panel 101, the plurality of the wedge insert 204 being positioned between and coupled with the first wall panel 101 and the second wall panel 101 such that the first wall panel 101 and the second wall panel 101 are thereby arranged straight relative to one another. The first wall panel 101 and the second wall panel 101 can be arranged vertically relative to one another such that the second wall panel 101 is positioned above the first wall panel 101, the first wall panel 101 including a first main wall 914 and a first flange 306B connected to the first main wall 914, the second wall panel 101 including a second main wall 914 and a second flange 306A connected to the second main wall 914. The wedge insert 24 between the first wall panel 101 and the second wall panel 101 can be straight or curved. The wedge insert 204 can include a support 407 and a tab 408 such that the wedge insert 204 forms a T-shaped configuration. The wedge insert 204 can include a plurality of the tab 408. The first inner surface 914A and the second inner surface 914A are arranged on a first axis 921 by way of the wedge insert 204. The first main wall 914 can include a first inner surface 914A, the first flange 306B including an upper surface 306B-2 which forms an angle 915 of greater than ninety degrees with the first inner surface 914A, the second main wall 914 including a second inner surface 914A, the second flange 306A including a lower surface 306A-1 which forms an angle 915 of greater than ninety degrees with the second inner surface 914A. The support 407 can include an outer surface 811, the tab 408 including a bottom surface 408A and a top surface 408B, the outer surface 811 of the support 407 forming an angle 812 of greater than ninety degrees with the bottom surface 408A of the tab 408 and an angle 812 of greater than ninety degrees with the top surface 408B of the tab 408, the upper surface 306B-2 of the first flange 306B being positioned adjacent and parallel to the bottom surface 408A of the tab 408, and the lower surface 306A-1 of the second flange 306A being positioned adjacent and parallel to the top surface 408B of the tab 408.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An aquaculture tank system, comprising:

a first wall panel;

a second wall panel; and a wedge insert positioned between and coupled with the first wall panel and the second wall panel such that the first wall panel and the second wall panel are thereby arranged straight relative to one another, the wedge insert including a tab including a top surface and a bottom surface that are nonparallel relative to one another.

2. The aquaculture tank system according to claim 1, further comprising a first row of wall panels, a second row of wall panels, and a plurality of the wedge insert, the first row of wall panels including the first wall panel, the second row of wall panels including the second wall panel, the plurality of the wedge insert being positioned between and coupled with the first wall panel and the second wall panel such that the first wall panel and the second wall panel are thereby arranged straight relative to one another.

3. The aquaculture tank system according to claim 1, wherein the first wall panel and the second wall panel are arranged vertically relative to one another such that the second wall panel is positioned above the first wall panel, the first wall panel including a first main wall and a first flange connected to the first main wall, the second wall panel including a second main wall and a second flange connected to the second main wall.

4. The aquaculture tank system according to claim 3, wherein the wedge insert between the first wall panel and the second wall panel is straight or curved.

5. The aquaculture tank system according to claim 4, wherein the wedge insert includes a support and the tab such that the wedge insert forms a T-shaped configuration.

6. The aquaculture tank system according to claim 5, wherein the wedge insert includes a plurality of the tab.

7. The aquaculture tank system according to claim 5, wherein the first main wall includes a first inner surface, wherein the second main wall includes a second inner surface, and wherein the first inner surface and the second inner surface are arranged on a first axis by way of the wedge insert.

8. The aquaculture tank system according to claim 7, wherein the first flange includes an upper surface which forms an angle of greater than ninety degrees with the first inner surface, the second flange including a lower surface which forms an angle of greater than ninety degrees with the second inner surface.

9. The aquaculture tank system according to claim 8, wherein the support includes an outer surface, the tab including a bottom surface and a top surface, the outer surface of the support forming an angle of greater than ninety degrees with the bottom surface of the tab and an angle of greater than ninety degrees with the top surface of the tab, the upper surface of the first flange being positioned adjacent and parallel to the bottom surface of the tab, and the lower surface of the second flange being positioned adjacent and parallel to the top surface of the tab.

10. A method of using an aquaculture tank system, the method comprising the steps of:

providing that the aquaculture tank system includes a first wall panel and a second wall panel; and positioning a wedge insert between, and coupling the wedge insert with, the first wall panel and the second wall panel such that the first wall panel and the second wall panel are thereby arranged straight relative to one another, the wedge insert including a tab including a top surface and a bottom surface that are nonparallel relative to one another.

11. The method according to claim 10, wherein the aquaculture tank system further includes a first row of wall panels, a second row of wall panels, and a plurality of the wedge insert, the first row of wall panels including the first wall panel, the second row of wall panels including the second wall panel, the plurality of the wedge insert being positioned between and coupled with the first wall panel and the second wall panel such that the first wall panel and the second wall panel are thereby arranged straight relative to one another.

12. The method according to claim 10, wherein the first wall panel and the second wall panel are arranged vertically relative to one another such that the second wall panel is positioned above the first wall panel, the first wall panel including a first main wall and a first flange connected to the first main wall, the second wall panel including a second main wall and a second flange connected to the second main wall.

13. The method according to claim 12, wherein the wedge insert between the first wall panel and the second wall panel is straight or curved.

14. The method according to claim 13, wherein the wedge insert includes a support and the tab such that the wedge insert forms a T-shaped configuration.

15. The method according to claim 14, wherein the wedge insert includes a plurality of the tab.

16. The method according to claim 14, wherein the first main wall includes a first inner surface, wherein the second main wall includes a second inner surface, and wherein the first inner surface and the second inner surface are arranged on a first axis by way of the wedge insert.

17. The method according to claim 16, wherein the first flange includes an upper surface which forms an angle of greater than ninety degrees with the first inner surface, the second flange including a lower surface which forms an angle of greater than ninety degrees with the second inner surface.

18. The method according to claim 17, wherein the support includes an outer surface, the tab including a bottom surface and a top surface, the outer surface of the support forming an angle of greater than ninety degrees with the bottom surface of the tab and an angle of greater than ninety degrees with the top surface of the tab, the upper surface of the first flange being positioned adjacent and parallel to the bottom surface of the tab, and the lower surface of the second flange being positioned adjacent and parallel to the top surface of the tab.

* * * * *